Nov. 3, 1925.

P. KUCERA 1,560,063

METHOD AND APPARATUS FOR CONSERVING HEAT FROM INDUSTRIAL FURNACES

Filed Aug. 14, 1920   3 Sheets-Sheet 1

Peter Kucera
Inventor

By George Ramsey
Attorney

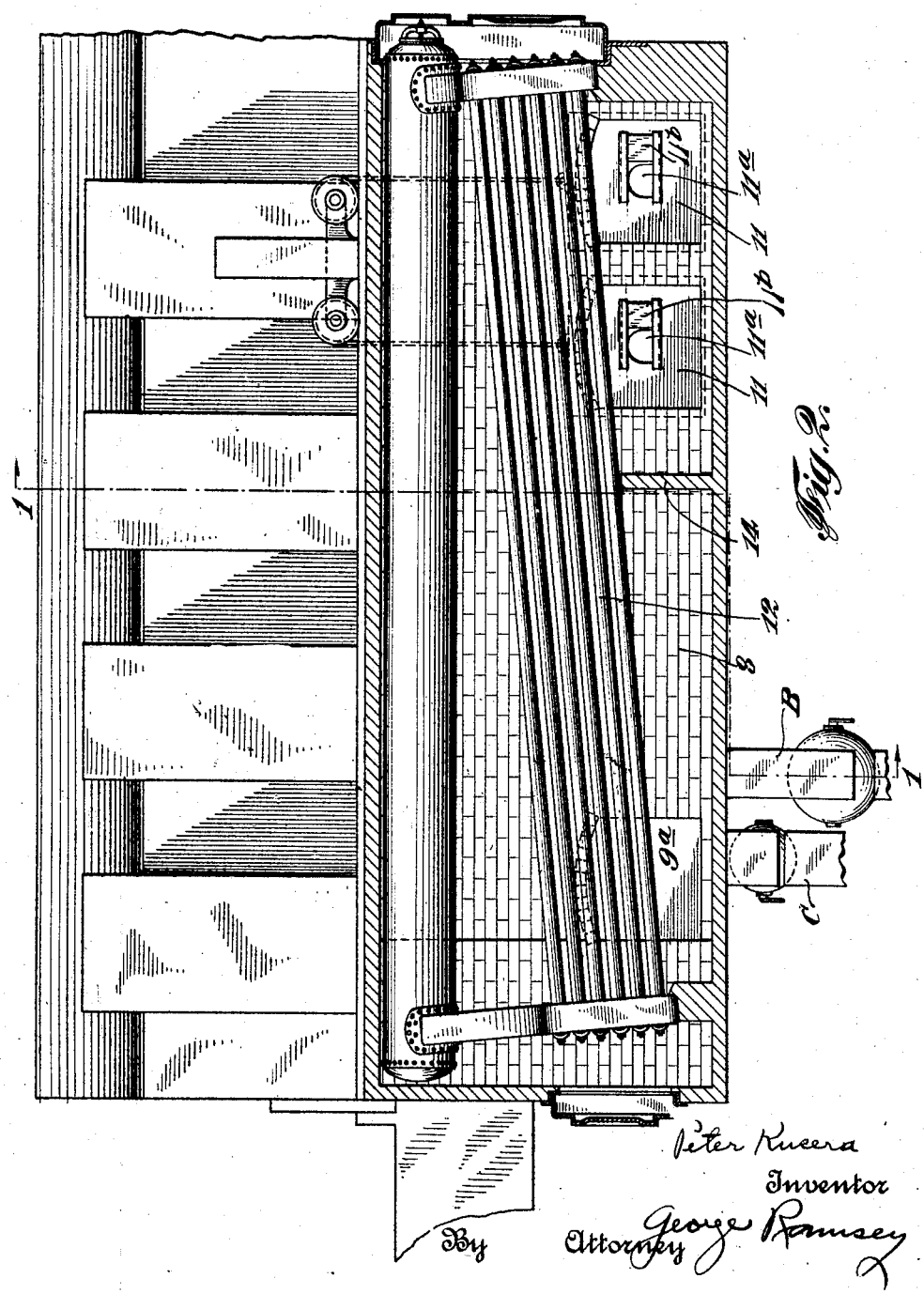

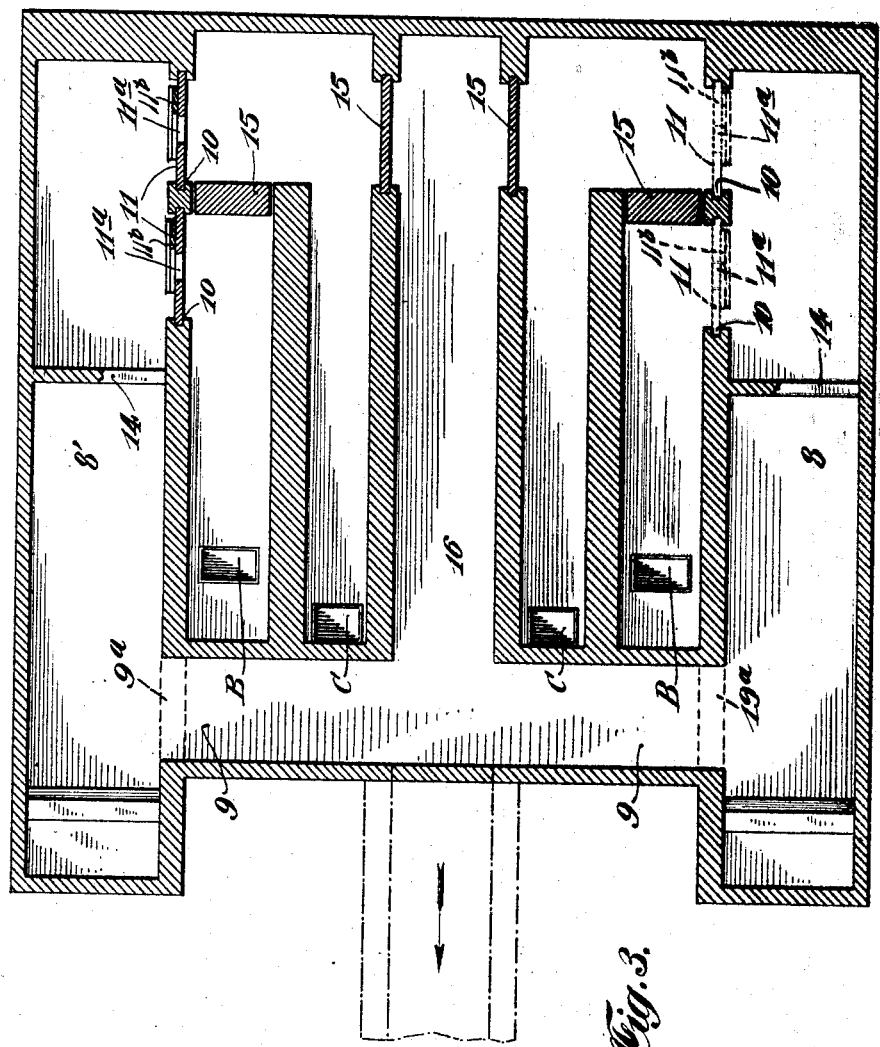

Patented Nov. 3, 1925.

1,560,063

UNITED STATES PATENT OFFICE.

PETER KUCERA, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE.

METHOD AND APPARATUS FOR CONSERVING HEAT FROM INDUSTRIAL FURNACES.

Application filed August 14, 1920. Serial No. 403,558.

*To all whom it may concern:*

Be it known that I, PETER KUCERA, a citizen of the United States, residing at Connellsville, in the county of Fayette, State of Pennsylvania, have invented certain new and useful Improvements in Methods and Apparatus for Conserving Heat from Industrial Furnaces, of which the following is a specification.

The present invention relates broadly to heat conservation and more especially to a method and apparatus for utilizing waste heat energy from industrial furnaces.

The principal object of the present invention is to provide a method and apparatus for utilizing hot gases after they have finished their useful work in an industrial furnace by conserving the energy from such gases before the gases have materially dropped in temperature.

Another and more specific object of the present invention is the provision of a method and apparatus for utilizing hot gases directly from an industrial furnace to make steam.

A further and important object of the present invention is the provision of a method and apparatus by which steam may be generated in a boiler or the like heated intermittently by gases from an industrial furnace, aided if desired by fresh fuel supplied between the intervals of heating by the furnace gases.

A still further object of the present invention is the provision of a method and apparatus for utilizing hot gases from an industrial furnace, such as a continuous glass furnace, wherein the direction of the hot gases is alternated through the furnace, steam generators located directly in the path of the hot gases, and devices for controlling the temperature of the generators in such manner as to prevent undue variations in temperature of the generators.

A still further and more specific object of the present invention is the provision of a method and apparatus for utilizing waste hot gases from a continuous glass furnace or the like by providing a plurality of steam generators arranged in such manner that one of the generators may be at all times in the path of the hot gases when the direction of the gases through the furnace is alternated, and wherein fresh fuel may be supplied to the generator which is not in the path of the hot gases.

A still further and more specific object of the present invention is a method and apparatus for operating a steam generator by means of waste hot gases from a glass furnace or the like and wherein fresh fuel may be supplied to the generator in such manner that the generator and furnace may be run either independently or in conjunction with each other.

Other and further objects of the present invention will in part be pointed out and will in part be obvious from the specification following by reference to the accompanying drawings forming a part thereof, and wherein like characters represent like parts throughout the figures thereof.

Realizing that the present invention may be carried out and practiced in manners and by construction other than those specifically herein described, I desire it to be understood that the present disclosure is illustrative and not to be considered in the limiting sense.

Figure 2 is a view comprising a side elevation taken on substantially line 2—2 of Figure 1;

Figure 3 is a diagrammatical plan view of the structure illustrated in Figures 1 and 2 on line 3—3 of Figure 1.

Figure 1:
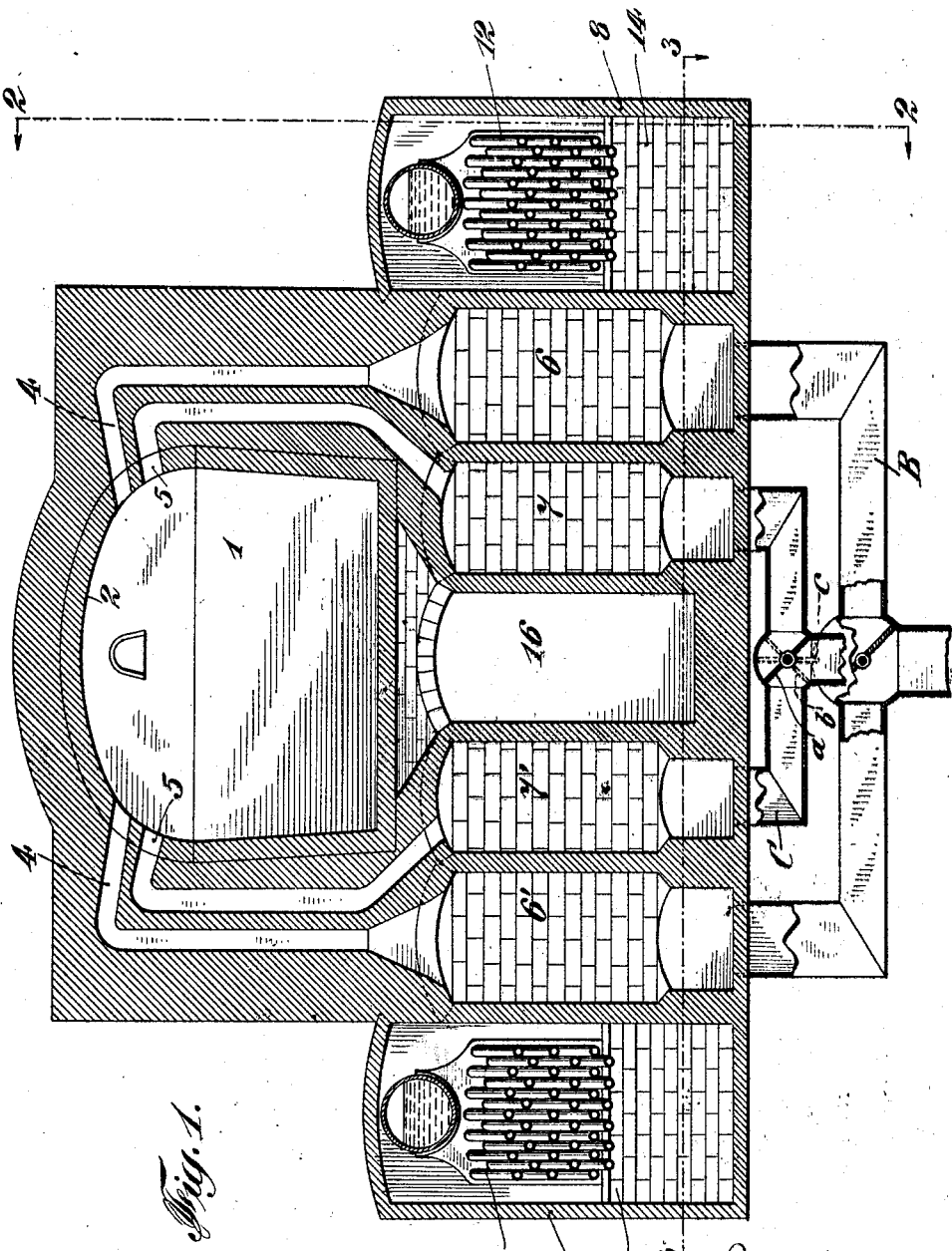
Figure 1 is a transverse sectional elevational view of one form of device embodying the present invention with reference to a continuous glass furnace.

Heretofore in the art the most common practice in connection with industrial furnaces utilizing high temperatures has been to permit the hot gases to flow through suitable conduits to a stack for carrying off waste gases. In certain industries, particularly the glass industry, the gases are incandescent when leaving the furnace and are of a very high temperature and the heat thereof is completely dissipated and wasted. This is more especially true where glass is melted in the modern continuous furnace, which is of the regenerative type wherein checker work of firebrick is provided beneath the bed of the furnace and a dome of the same material is provided above the bed of the furnace. The parts are arranged so that the checker work is divided into at least two groups, so that the hot gases from the furnace bed pass out through one group of checker work while the incoming fuel passes through the other group of checker work. In this construction the direction of the fuel is changed from time to time so that the incoming fuel passes through hot checker work and is heated prior to reaching the bed of the furnace. In this type of furnace it has been customary to permit the waste gases to go directly from the checker work, on the outlet side, to the stack. The hottest zone where the waste gases leave the furnace is adjacent the sides of the checker work and the gases are cooled considerably by the time the gases reach the stack, which of necessity, because of the construction of the furnace, must be placed some distance from the checker work. Heretofore in the art it has been proposed to place water heaters and similar devices in the path of hot gases from furnaces, and such constructions have been placed in the stack. Such devices are of small utility because by the time the gases reach the stack the gases are so cool the efficiency is very low. Furthermore, because of the heat exchange taking place at a relatively low temperature the products of combustion tend to condense and deposit on the device installed in the stack. Also such arrangements interfere with stack draughts.

Applicant's device overcomes the difficulties of the known art by providing a method and apparatus which is adapted to conserve the hot gases from an industrial furnace immediately after the useful work of the gases in the furnace is completed and before any substantial drop in temperature has occurred. In the regenerative type of furnace where the direction of the gases is alternated through the furnace, it is desirable to have the steam generator located to receive the gases immediately as they leave one or more of the regenerators associated with the furnace. This necessitates the generators being arranged on each side of the furnace and in normal operation of the furnace one generator would be receiving hot gases while the other would be in the path of cold air or entirely out of the effective zone of operations of the incandescent gas. It would be disastrous to the generator to permit it to run hot and then be suddenly cooled. In order to overcome this difficulty where the invention is embodied in a continuous glass furnace, provision is made for supplying one generator with a small amount of fresh fuel while the other one generator is being subjected to the hot gases. There is another very important feature of the present invention and that is that it is adaptable to be practiced and constructed with established plants without substantial reconstruction of the furnaces in use. In other words, the present invention may be adopted by the matter of additional rather than the matter of complete reconstruction. The invention further provides cutting out the stream generator without injury to any of the apparatus, or the steam generating apparatus may operate efficiently when the furnace is not being operated.

In the illustrative disclosure I have shown a form of furnace of the Siemens type suitable for glass making, wherein the numeral 1 designates the hearth having the reverberatory roof 2, and supplied with opposite series of air passages 4. The air passages on the respective sides of the hearth are associated with the respective air regenerators 6 and 6′, while the opposed series of gas passages 5 are similarly associated respectively with the gas regenerators 7 and 7′. The regenerators are constructed of masonry checker work in the customary fashion, and are associated with suitable valve controlled conduits, illustrated diagrammatically in Figure 1 and by B and C in Figure 3, for the introduction of fuel gas and air. The structure thus far described is adapted to function as a regenerative furnace in the conventional manner, the fuel gas and air being forced in through the regenerators at one side, injected and burned under the reverberatory roof of the furnace, withdrawn through the passages on the opposite side of the furnace, led through the opposite regenerators to heat them, and discharged to the stack, the operation being reversed at suitable intervals so that the opposite sets of regenerators are alternately heated by the exhaust gases and utilized to heat the incoming air and gas.

In the embodiment of my invention with a furnace of this construction, I construct a set of additional compartments 8 and 8′, utilizing the outer side walls of the furnace as the inner wall thereof. At the rear end of the furnace these compartments are connected to the bus flues 9 leading to the stack, while at the front end of the furnace they have communication with the sole channels of the associated regenerators through openings 10 which are controlled by dampers 11. Within these compartments 8 are disposed suitable water tube boilers 12, their heating surfaces being disposed in the path of gases flowing from the openings 10 to the flue openings 9$^a$, any desired features such as a baffle wall 14, being arranged to direct the flow of gases relative to the heating elements. By any suitable means such as control ports 11$^a$ in the dampers 11, the respective boiler compartments 8 and 8′ have communication with their associated air and gas regenerators when their dampers 11 are closed. This is to permit the passage of a certain small proportion of the fuel gas and air into the boiler compartment when said regenerators are functioning as supply paths for heating the air and gas being fed to the furnace. Under this condition the air and gas passing through the ports 11ª is burned in the boiler compartment, thereby placing in control of the operator the temperature of the boiler associated with the regenerators then operating as inlets. The opposite dampers 11 being open, the boiler and the compartment controlled thereby will be subjected to the hot burning gases from the furnace after their passage through the associated regenerators, and immediately upon their passage therefrom through the openings 10 on their way to the stack.

In the event it is desired, either one or both of the boilers may be operated independently of the furnace by supplying them directly with fuel gas and air; and, in the event it is desired to operate the furnace without operating the boilers, the boiler compartments may be entirely cut off by closing the ports 11ª by means of dampers 11ᵇ, the necessary communication with the stack being controlled by the dampers 15, which give direct communication between the sole channels of the regenerators and the stack flue 16.

Conventional supply dampers for controlling these operations are illustrated diagrammatically in Figure 1, wherein a damper is shown at the position $a$ in the gas supply conduit C, in which position the entire feed of gas is to the regenerator 7'. It will be understood that the air conduit B is controlled by dampers similarly operable. In the position illustrated by the dotted line $b$, the supply of fuel will be directed to regenerator 7; while with the damper in the position indicated by the dotted line marked $c$, the supply of fuel will be divided between the regenerators 7 and 7'. The damper may be placed at this position when it is intended to operate the steam generating apparatus without operation of the furnace.

Having thus described my invention, what I claim is:

1. The method of operating an industrial furnace and a pair of boilers in conjunction which comprises storing a portion of the heat of the products of combustion of the furnace; during alternate intervals using a further portion of the heat of the products of combustion to heat the first boiler and utilizing fresh fuel to heat the second boiler; and during intermediate intervals utilizing a further portion of the heat of the products of combustion to heat the second boiler and utilizing fresh fuel to heat the first boiler.

2. The method of operating a regenerative industrial furnace and a pair of boilers in conjunction which comprises storing a portion of the heat of the products of combustion of the furnace; utilizing such heat previously stored to heat the air supplied to the furnace; during alternate intervals utilizing a further portion of the heat of the products of combustion of the furnace to heat the first boiler and utilizing fresh fuel to heat the second boiler; and during intermediate intervals utilizing a further portion of the heat of the products of combustion of the furnace to heat the second boiler and utilizing fresh fuel to heat the first boiler.

3. The method of operating an industrial furnace combined with a pair of regenerative means each of which is associated with a boiler, which comprises; during alternate intervals passing the gases of combustion of the furnace through the first regenerative means and then through the boiler associated therewith, and supplying fresh fuel to the boiler associated with the second regenerative means; and during intermediate intervals passing the gases of combustion of the furnace through the second regenerative means and then through the boiler associated therewith, and supplying fresh fuel to the boiler associated with the first regenerative means.

4. The method of operating an industrial furnace combined with a pair of regenerative means each of which is associated with a boiler, which comprises; during alternate intervals supplying air to the furnace through the second regenerative means, passing the gases of combustion of the furnace through the first regenerative means and then through the boiler associated therewith, and supplying fresh fuel to the boiler associated with the second regenerative means; and during intermediate intervals supplying air to the furnace through the first regenerative means, passing the gases of combustion of the furnace through the second regenerative means and then through the boiler associated therewith, and supplying fresh fuel to the boiler associated with the first regenerative means.

5. In combination, an industrial furnace, two pairs of regenerators, a boiler associated with each pair of regenerators, means to pass fuel and air through the first pair of regenerators to the furnace and to supply fuel to the boiler associated therewith, means to pass the gases of combustion of the furnace through the second pair of regenerators and then through the boiler associated therewith, and means to interchange said pairs of regenerators and their associated boilers, whereby fuel is supplied to the boiler associated with the second pair of regenerators and the gases of combustion of the furnace are passed through the first pair of regenerators and the boiler associated therewith.

6. In combination, an industrial furnace, two pairs of regenerators, a boiler adjacent each pair of regenerators, means to pass fuel and air through the first pair of regenerators to the furnace and to supply fuel to the boiler adjacent thereto, means to pass the gases of combustion of the furnace through the second pair of regenerators and then directly to the boiler adjacent thereto, and means to interchange said pairs of regenerators and their associated boilers, whereby fuel is supplied to the boiler adjacent the second pair of regenerators and the gases of combustion of the furnace are passed through the first pair of regenerators and the boiler adjacent thereto.

7. In combination, an industrial furnace, two regenerative means, a boiler associated with each regenerative means, means to pass air through the first regenerative means to the furnace and to supply fuel to the boiler associated therewith, means to pass the gases of combustion of the furnace through the second regenerative means and then through the boiler associated therewith, and means to interchange said regenerative means and their associated boilers, whereby fuel is supplied to the boiler associated with the second regenerative means and the gases of combustion are passed through the first regenerative means and then to the boiler associated therewith.

8. In combination, an industrial furnace, two regenerative means, a boiler adjacent each regenerative means, means to pass air through the first regenerative means to the furnace and to supply fuel to the boiler adjacent thereto, means to pass the gases of combustion of the furnace through the second regenerative means and then directly to the boiler adjacent thereto, and means to interchange said regenerative means and their associated boilers, whereby fuel is supplied to the boiler adjacent the second regenerative means and the gases of combustion are passed through the first regenerative means and then through the boiler adjacent thereto.

9. In combination, an industrial furnace, two regenerative means, a boiler associated with each regenerative means, means to pass air through the first regenerative means to the furnace and to supply fuel to the boiler associated therewith, means to pass the gases of combustion through both the second regenerative means and the boiler associated therewith, and means to interchange the regenerative means and their associated boilers, whereby fuel is supplied to the boiler associated with the second regenerative means and the gases of combustion are passed through both the first regenerative means and the boiler associated therewith.

10. In combination, an industrial furnace, two regenerative means, a boiler adjoining each regenerative means, means to pass air through the first regenerative means to the furnace and to supply fuel to the boiler associated therewith, means to pass the gases of combustion through both the second regenerative means and the boiler adjacent thereto, and means to interchange the regenerative means and their adjacent boilers, whereby fuel is supplied to the boiler adjacent the second regenerative means and the gases of combustion are passed through both the first regenerative means and the boiler adjacent thereto.

PETER KUCERA.